United States Patent [19]

Clark et al.

[11] Patent Number: 4,537,077

[45] Date of Patent: Aug. 27, 1985

[54] LOAD DYNAMICS COMPENSATION CIRCUIT FOR SERVOHYDRAULIC CONTROL SYSTEMS

[75] Inventors: Allen J. Clark; Dale N. Maue, both of Minnetonka, Minn.

[73] Assignee: MTS Systems Corporation, Eden Prairie, Minn.

[21] Appl. No.: 578,055

[22] Filed: Feb. 8, 1984

[51] Int. Cl.³ .................. G01N 29/00; G01N 3/32; B06B 1/18; G01M 7/00
[52] U.S. Cl. .................................. 73/665; 73/662; 91/35; 367/190
[58] Field of Search ............... 73/662, 663, 665, 666; 367/190; 91/35

[56] References Cited

U.S. PATENT DOCUMENTS

| | | | |
|---|---|---|---|
| 3,800,588 | 4/1974 | Larson et al. | 73/665 |
| 3,913,389 | 10/1975 | Larson | 73/665 |
| 3,918,298 | 11/1975 | Petersen et al. | 73/665 |
| 4,336,745 | 6/1982 | Lund | 91/35 |

OTHER PUBLICATIONS

Matsuzaki, A. and Hirai, H., "Electro-Hydraulic Shaking Machine," Report 1 and 2, Sep. 1976, vol. 19, No. 135, pp. 1025-1038, Bulletin of the Japan Society of Mechanical Engineers.

Matsuzaki, A. and Hirai, H., "Electro-Hydraulic Shaking Machine," Report 3, May 1977, vol. 20, No. 143, pp. 561-567, Bulletin of the Japan Society of Mechanical Engineers.

Stringer, Joh, *Hydraulic Systems Analysis An Introduction*, "Hydraulic Frequency", 1976, pp. 45-53.

Takahashi, Y. et al., "Effects of Test Specimen Reaction Loads on Shaking Tables", Proc. 5th World Conference on Earthquake Engineering, Rome 1974, pp. 1426-1429.

*Primary Examiner*—Howard A. Birmiel
*Attorney, Agent, or Firm*—Kinney & Lange

[57] ABSTRACT

A load dynamic compensation circuit for a servohydraulic control system for fixtures and specimens being tested operating in various degrees of freedom, for example in an environment to simulate earthquakes to test building specimens, or to provide road profile simulation for rail and automobile vehicles, or wind buffet loads for aircraft. A compensation circuitry compensates for specimen displacement disturbances in the control loop that are a function of the force exerted from the specimen and the acceleration of the test mass. This specimen disturbance factor may be provided by adding only a differential pressure transducer to measure the force on the actuator, and an accelerometer to measure the mass acceleration, to obtain the necessary electrical signals, which after being modified by factors including the oil column compliance spring factor, the piston area and the servovalve flow gain, is differentiated to compensate for the piston integration, and is then added in a summing junction into the servovalve command signal loop. The compensation signal is an anticipatory signal compensating for load dynamics on the specimen.

4 Claims, 3 Drawing Figures

LOAD DYNAMICS COMPENSATION CIRCUIT FOR SERVOHYDRAULIC CONTROL SYSTEMS

BACKGROUND OF THE INVENTION

1. Field of the Invention

The present invention relates to control systems for controlling movement of loads in a test environment.

2. Description of the Prior Art

U.S. Pat. No. 3,913,389, issued Oct. 21, 1975 to Larson, illustrates a circuit for compensating overturning moments on a test table and specimen arrangement that is being controlled in horizontal and vertical planes by hydraulic actuators. The control system includes means to provide a compensation signal to the servovalve control loop for compensating for the overturning moment on the specimen. The center of gravity of the specimen is offset from the central plane of the horizontal actuator moving the table and specimen.

The present invention is related to the $F_H$ signal illustrated in FIGS. 2 and 3 of the drawings of U.S. Pat. No. 3,913,389. Similar to that patent a compensating signal for performance degrading specimen disturbances is injected into the basic servo hydraulic position control loop. The present invention's technique for obtaining the compensating signal is much more accurate and can be used to compensate for more general loads. This enables more precise control without readjustment of the electronic system with changing general specimen loads.

Compensating the servovalve control circuit for linearization as shown and described in U.S. Pat. No. 4,336,745 is desired for providing a servovalve output which is linear with respect to its input signal. When such linearization is provided the additional compensation signal of the present invention provides optimum compensation.

SUMMARY OF THE INVENTION

The present invention relates to developing a compensation signal for specimen disturbances that are caused during displacement control of test specimens, for example earthquake simulation testing devices. The disturbances of such specimens may be modeled by a displacement disturbance affecting the signal in the control loop. Such displacement disturbance is a function of the force on the specimen and the stiffness factor of the hydraulic oil in the actuator. A mathematical model illustrates that in accordance with Newton's law the dynamics of the load are a function of the specimen force, and by appropriately scaling a measured signal representing the specimen force and the table mass acceleration, the load dynamics compensation can be provided as an electrical signal that is added to the error signal normally used for controlling a servovalve to obtain the test actuator movement.

In the present invention, the force from the actuator may be measured directly by a differential pressure sensor. Appropriate circuitry is utilized for determining the specimen force signal by combining the actuator force signal with a signal representing the acceleration of the actuator piston, the stiffness of the oil column in the actuator scale factor and the flow gain of the servovalve scale factor, and for differentiating the scaled or combined signal to accommodate the piston integration factor during actuator operation and thus provide the load dynamics compensation. When the compensation signal has been scaled appropriately it is added into the servovalve control loop signal through a summing junction.

The load dynamics compensation signal added into the control loop is an anticipatory signal to compensate for disturbances due to disturbing forces on the table mass itself.

DETAILED DESCRIPTION OF THE PREFERRED EMBODIMENT

Figure 1:
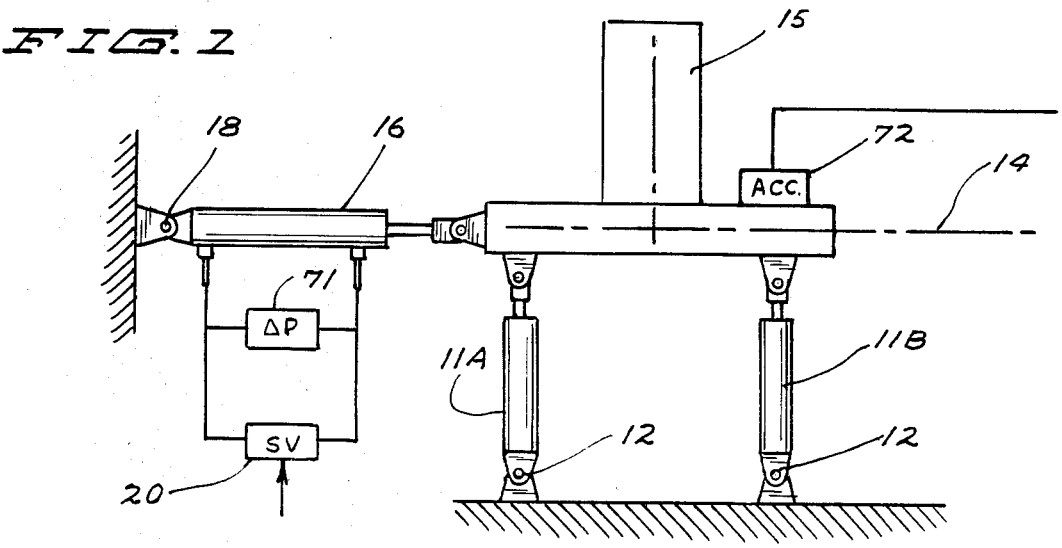
FIG. 1 is a typical schematic representation of a specimen and table mounting which has several degrees of freedom.

The system with which the present invention can be utilized is illustrated in FIG. 1, which corresponds to that shown in U.S. Pat. No. 3,913,389. The test table or fixture 10 shown in side view is a rectangular table, that can be a rigid test table such as that shown in U.S. Pat. No. 3,800,588. A plurality of hydraulic actuators 11A, and 11B are mounted for supporting the table, and usually there will be at least four such actuators, one at each corner. The actuators 11A and 11B are mounted on support pins 12 to a support pad and are pivotally connected as at 13 to the underside of the test table 10. This mounting permits the table to be displaced in horizontal directions, along a horizontal plane indicated at 14, at the same time the table is reciprocated in vertical directions by the actuators 11A and 11B. A specimen indicated by a block 15 is mounted on the test table or fixture 10, and is secured to the table for displacement with the table in both horizontal and vertical directions. The horizontal displacement, along the force line lying as shown in plane 14, is provided by a horizontal actuator 16 that is connected as at 17 to one end of the table or fixture 10. More than one actuator 16 may be used if desired. The actuator base end is connected as at 18 to a suitable support or foundation. The horizontal actuator 16 is a double acting hydraulic actuator reciprocated at a desired frequency typically with a servovalve 20 controlled in a normal manner. The displacement of the actuator 16 is in direction along a line lying generally in the plane 14. The specimen 15 is thus simultaneously displaced or vibrated in two mutually perpendicular directions. The actuators 11A, 11B and 16 may be operated in a suitable manner from servo controllers driving servovalves that control the displacement of the actuators in a manner that is shown in U.S. Pat. No. 3,913,389 except that with the present invention, a different load dynamics compensation signal is provided for each degree of freedom. The schematic representation of the control loop for each degree of freedom used with such servovalves is shown in FIG. 3 and will be explained in detail.

Figure 2:
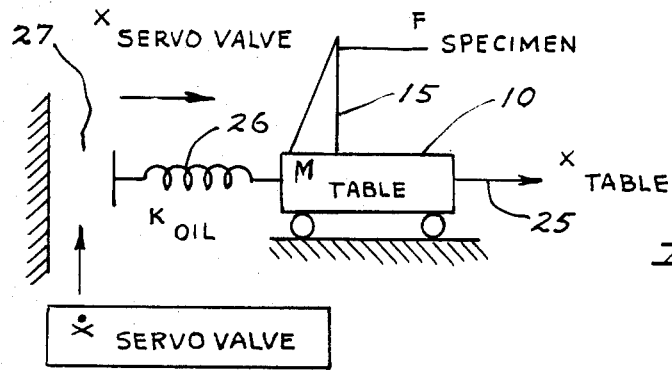
FIG. 2 is a schematic representation of a typical general degree of freedom of the device of FIG. 1 and other general position loops, which illustrates the various forces and displacements operating thereon and providing a representation of the effect of compressibility of the hydraulic oil column.

In FIG. 2, a schematic representation of the components shows the table mass represented by block 10, which is mounted for movement in a generalized displacement direction indicated at 25. The specimen is indicated at 15 just as it is in FIG. 1, and the oil column of actuator 16 is schematically separated into components including a spring represented at 26 which is a representation of the compliance factor or compressibility factor k of the hydraulic oil. The space shown at 27 represents the displacement of the actuator 16 that is the integrated flow of oil through the servovalve. It is known and has been shown that liquids, sometimes considered incompressible, do in fact have a compressibility factor or compliance factor which indicates the stiffness of the oil column. Under force, the column of oil in the actuator acts as a spring to cause resonance of the table and the specimen at frequencies that are within the range of normal testing frequencies being used for dynamic simulation. This oil spring is the actuating force transmission medium for the hydraulic power from the servovalve to the specimen mass. See, for example, Chapter 3, Pages 45–53 of *Hydraulic Systems Analysis* by John Stringer (John Wiley & Sons, 1976) for an analysis of representative cases involving oil column compressibility.

The mathematical designations are as follows: The displacement of the table is represented in FIG. 2 as an "$x_{Table}$"; "$k_{oil}$" represents the compliance factor of the oil or the spring factor, that is, the compressibility of the oil; and "$x_{Servovalve}$" is the displacement of the servovalve for integrated flow without the oil compressibility factor. The table mass $M_{Table}$ is illustrated in FIG. 2, and represents the mass of the table; and the displacement of the table is $x_{Table}$. FIG. 2 represents the major motions and forces present when the table is moved horizontally with actuator 16.

Figure 3:
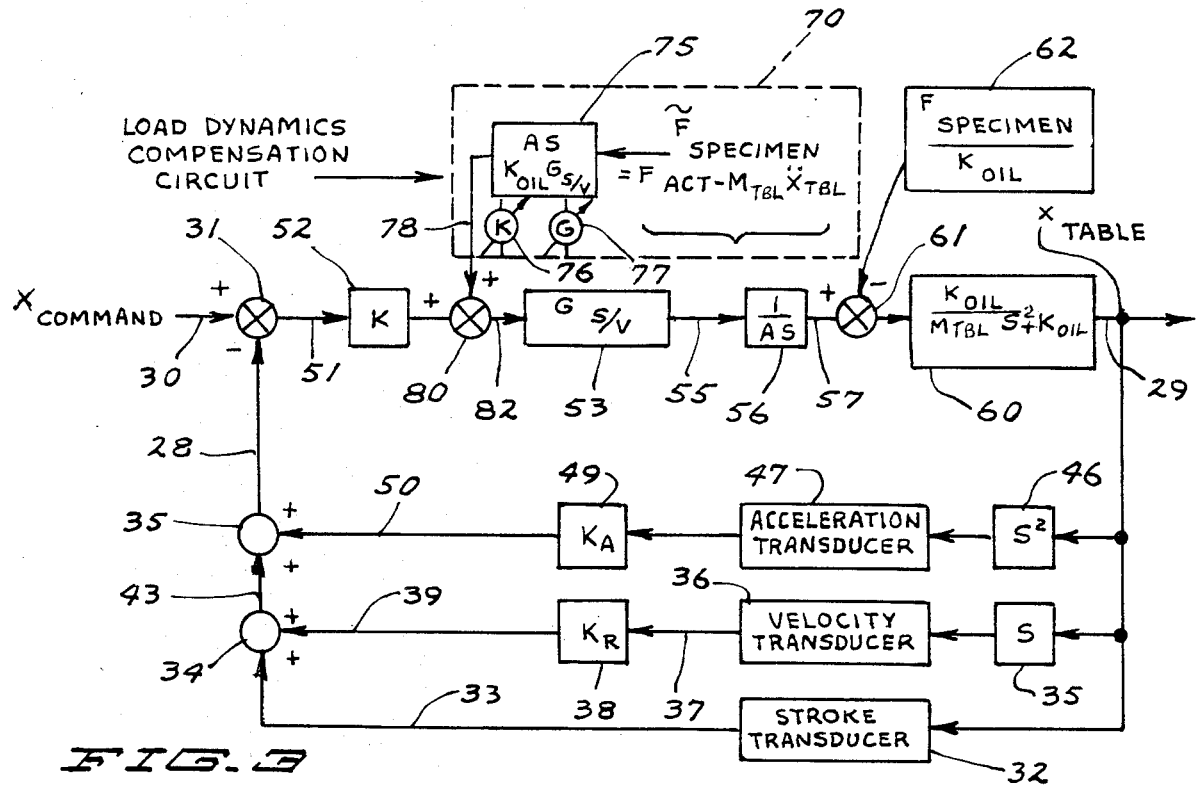
FIG. 3 is a functional block diagram of a control system including the compensation signal of the present invention.

Referring to FIG. 3, showing a control loop used for servovalve control, a table displacement command input signal is provided along a line indicated at 30 to a summing junction 31. This signal is a voltage that has a value that represents the desired table movement. The summing junction 31 sums the input voltage signal along line 30 with feedback signals along line 28. In a conventional system, the feedback will be one or more signals representing the stroke or displacement of the actuator or fixture plus stabilization. The table or actuator velocity, or the table acceleration can be obtained with a stroke transducer 32 directly coupled to the table or actuator being operated. A stroke feedback signal along line 33 is provided to a summing junction 34. The table displacement signal can be scaled or modified to provide the signal on line 33 if desired.

In FIG. 3, line 29 represents table displacement. This is measured by the stroke transducer 32. For velocity feedback a velocity transducer 36 or some equivalent means of velocity computation can be used to measure the table velocity represented by the differentiator 35. A velocity feedback signal on line 37 is appropriately scaled by an amplifier 38 to provide a signal on line 39 indicating velocity of the fixture or table. The signal on line 39 is summed with the signal on line 33 at the summing junction 34. The output of summing junction 34 is provided on a line 43 and fed to a second summing junction 35, which has an acceleration input signal used for stabilization.

This acceleration signal can be obtained by an acceleration transducer 47. This is fed through an acceleration feedback amplifier 49 with an appropriate gain. An acceleration feedback voltage signal on line 50 is then fed to the summing junction 35. The summing junction 35 provides the summed feedback signal along line 28 to the summing junction 31. The summing of the input command signal represented as a voltage on line 30 and the total feedback voltage signal on line 28 results in an error signal output, that is, a signal that indicates the difference between the desired displacement (line 30), and the actual displacement plus stablization signals (line 28) and this error voltage signal is provided on a line 51 from the output of the summing junction 31 to an error amplifier 52 that is of appropriate gain for the servo control loop.

The components and techniques just described for obtaining feedback and combining the feedback with a command for error signal control are now used in many mass loaded position servo control systems.

In the normal control system, the signal from amplifier 52 is the signal fed to the servovalve, which valve opens for flow in proportion to the input voltage level of such signal. In the present invention the signal from amplifier 52 is appropriately modified. In the schematic diagram of FIG. 3, the servovalve flow gain is represented mathematically at 53, and the flow output of the servovalve is represented as a flow along a line 55. This line represents hydraulic oil flow into an actuator represented at 56. The actuator piston area is represented as A, and the "1/S" in box 56 is a symbol mathematically representing the effect of the piston integration of the flow, which results in displacement of the actuator output rod. The output line 57 from the actuator is a function of $x_{s/v}$ or displacement of the servovalve.

In the mathematical model, the box 60 includes a quantity representing the table mass and oil compliance dynamics. $k_{oil}$ is the compliance or stiffness factor of the oil, which quantity is divided by a quantity comprising the mass of the table ($M_{Table}$), times table acceleration ($S^2$), plus the compliance factor of the oil ($k_{oil}$). The summing junction represented at 61 is a mathematical representation of a summing of the displacement of the servovalve, $x_{s/v}$, and the actual force on the specimen ($F_{specimen}$) divided by the compliance of the oil ($k_{oil}$) which quantity is represented at 62. The displacement of the table is represented as the output of line 29.

The present invention teaches obtaining a load dynamics related signal from a load dynamics compensation circuit outlined in dotted lines at 70. This dynamics compensation circuit 70 requires knowing the force from the specimen ($F_s$ or $F_{specimen}$), which according to Newton's law is equal to the actuator force minus the table mass times the acceleration of the table.

Regardless of complexity, a disturbance force from the specimen may be modeled by a displacement disturbance entering the control loop as $F_{specimen}$ divided by $k_{oil}$. Newton's law equation for the table mass can be written:

$$+F_x = M_{Table} \ddot{x}_{Table} = -F_{specimen} + F_{actuator} = -F_{specimen} - k_{oil}(x_{Table} - x_{s/v}).$$

Taking the Laplace transform and assuming zero initial conditions $$(M_{Table} S^2 + k_{oil}) x_{Table} = F_{spec.} + k_{oil} x_{s/v}$$

$$x_{Table} = \frac{k_{oil}}{M_{Table} S^2 + k_{oil}} \left[ x_{s/v} - \frac{F_{spec.}}{k_{oil}} \right]$$

In the above notation $M_{Table}$ is the mass of the table; $\ddot{x}_{Table}$ is acceleration of the table; $k_{oil}$ is the spring compliance of the oil or stiffness factor of the oil; $F_{actuator}$ is the force of the actuator; $F_{specimen}$ is the force of the specimen; $x_{s/v}$ is the integrated flow of the servovalve; and $x_{Table}$ is the displacement of the table.

In obtaining a signal that represents the force on the specimen, the mass of the table (which is known) times the acceleration of the table, is equal to minus the force of the specimen plus the force on the actuator. Thus, the force on the specimen can be set up as follows:

$$F_{specimen} = F_{actuator} - M_{Table} \ddot{x}_{Table}$$

Therefore the specimen force can be calculated by measuring the actuator force, and the table mass acceleration. An accelerometer illustrated generally at 72 in FIG. 1 may be placed on the table 10 to measure the acceleration of the table mass, and a differential pressure transducer 71 shown in FIG. 1 can be used for measuring the force of the actuator. These signals are combined by subtracting the acceleration signal received from the accelerometer 72, (after proper scaling for the mass value) from the differential pressure signal ($F_{act}$), which represents the force on the actuator, to provide $F_{specimen}$ represented in FIG. 3. The $F_{specimen}$ force signal is modified by a scaling differential amplifier indicated generally at 75. The oil column compliance or spring factor signal, $k_{oil}$ may be provided as a parameter (gain 76), and a signal representing the gain of the servovalve ($G_{s/v}$) from an amplifier 77 representing the gain value are used as divisors. The area of the piston of the actuator is represented by A and a parameter representing the area is provided from a gain source 78 as a numerator. The total signal is differentiated, as represented by "S" in amplifier 75. The amplifier 75 provides an output signal along a line 78, which is a voltage that is summed at a summing junction 80 that also receives the signal from the error amplifier 52. The signal on line 78 represents the load dynamics compensation signal. The signal on line 78 provides an anticipatory addition to the servovalve control signal on the line 82 that is fed to the servovalve 53 to compensate for disturbances from table acceleration and actuator force, or in other words to compensate for the load dynamics.

The parameters representing the oil compliance factor, area and flow gain are gains having values representing the values of the quantity. Dividing and multiplying gains is conventionally done. Differentiating is done conventionally as well.

Thus, by adding an accelerometer on the table to obtain a signal representing mass acceleration, and a differential pressure transducer, to measure the force on the actuator (which was also used in U.S. Pat. No. 3,913,389), the more accurate compensation signal for load dynamics compensation can be added into the control system with little expense. Higher accuracy, particularly for nonlinear, complex, general specimen loads is achieved.

This present invention can be also used for multiple channel test systems as well as multiple degree of freedom tables by utilizing the same technique for controlling multiple masses with interconnections.

Although the present invention has been described with reference to preferred embodiments, workers skilled in the art will recognize that changes may be made in form and detail without departing from the spirit and scope of the invention.

What is claimed is:

1. In a servo controlled displacement generating apparatus having control means for generating an error signal representing the desired displacement of a servovalve that will provide a desired displacement of a heavy dynamically operated load, said load being driven by an actuator having an area and a displacement, said actuator being provided with hydraulic oil through said servovalve, the improvement comprising:
    means for providing a compensation signal summed with said error signal, which compensation signal is a function of the load acceleration and actuator force scaled through a differentation function including scaling factors relating to the actuator area, divided by factors comprising functions of the compliance of the oil and the flow gain of the servovalve.

2. The improvement of claim 1 wherein the load comprises a table and a specimen being tested mounted on the table and wherein the means for providing includes an acceleration sensor mounted to sense acceleration of the mass of the table and specimen being tested.

3. A test apparatus having a table movable under control of an actuator, said table having a mass, and said actuator being operated with hydraulic oil under pressure, a servovalve for actuating said actuator, control means for providing an error signal to control the displacement of said servovalve including feedback stabilization circuitry for closed loop control, a summing junction on the input side of said servovalve, and means for providing an electrical component signal to said servovalve comprising means for providing a first signal proportional to the mass acceleration of said fixture, means for providing a second signal proportional to the force of the actuator, and differential amplifier means for receiving a third signal representing the second signal minus the first signal and differentiating said third signal and including scaling means for scaling the third signal as a function of the area of the actuator, and for dividing the signal by a factor which is a product of compliance factor of the oil and the flow gain of the servovalve.

4. The test apparatus of claim 3 wherein the circuitry third signal is represented by $F_{act} - M_T \ddot{x}_T$ where $F_{act}$ is the measured force of the actuator, $M_T$ is the table mass; and $\ddot{x}_T$ is table acceleration and the differential amplifier operates mathematically as $$\frac{AS}{k_{oil} G_{sv}}$$

where
A is the actuator area;
$k_{oil}$ is the hydraulic oil compliance factor; and
$G_{sv}$ is flow gain of the servovalve controlling flow to the actuator and S is the Laplace operator denoting differentiation.

* * * * *